(12) United States Patent
Petricek et al.

(10) Patent No.: US 11,522,459 B2
(45) Date of Patent: Dec. 6, 2022

(54) COMBINING TEMPERATURE MONITORING AND TRUE DIFFERENT CURRENT SENSING IN A MULTIPHASE VOLTAGE REGULATOR

(71) Applicant: Renesas Electronics America Inc., Milpitas, CA (US)

(72) Inventors: Shea Petricek, Dallas, TX (US); Chun Cheung, Bridgewater, NJ (US); Ankit Sharma, Raritan, NJ (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 15/927,667

(22) Filed: Mar. 21, 2018

(65) Prior Publication Data
US 2018/0278162 A1     Sep. 27, 2018

Related U.S. Application Data

(60) Provisional application No. 62/475,029, filed on Mar. 22, 2017.

(51) Int. Cl.
*H02M 3/158* (2006.01)
*H02M 1/00* (2006.01)
*H02M 1/32* (2007.01)

(52) U.S. Cl.
CPC ........ *H02M 3/1584* (2013.01); *H02M 1/0009* (2021.05); *H02M 1/327* (2021.05)

(58) Field of Classification Search
CPC ........ H02M 1/32; H02M 3/158; H02M 3/285; H02M 2001/0025; H02M 2001/327;

(Continued)

(56) References Cited

U.S. PATENT DOCUMENTS 7,026,798 B2    4/2006 Cheung et al.
7,812,581 B2   10/2010 Qiu et al.
(Continued)

FOREIGN PATENT DOCUMENTS

CN     102810981 A    12/2012
CN     102156498 A     1/2014
(Continued)

OTHER PUBLICATIONS

ISL68144 "Digital Dual Output, 4-Phase Configurable, PWM Controller with PMBus for Cavium" Renesas Datasheet, Rev. 3.00, Feb. 8, 2018, pp. 1-48.

(Continued)

*Primary Examiner* — Gustavo A Rosario-Benitez
(74) *Attorney, Agent, or Firm* — Foley & Lardner LLP

(57) ABSTRACT

According to certain aspects, the present embodiments are directed to techniques for providing the ability to monitor one or more operational parameters of a voltage regulator. In embodiments, the voltage regulator is a multiphase voltage regulator having a plurality of power stages corresponding to each respective phase. In these and other embodiments, the operational parameters include one or both of a phase current and a phase temperature. According to certain additional aspects, the present embodiments provide the ability to monitor the respective phase current output and phase temperature of each phase independently. According to further aspects, this ability to monitor the operational parameters is achieved while minimizing circuit complexity.

19 Claims, 3 Drawing Sheets

(58) Field of Classification Search
CPC ............ H02M 2001/003; H02M 1/00; H02M 2001/0009; H02M 2001/0067–0077; H02M 3/1584
See application file for complete search history.

(56) References Cited

U.S. PATENT DOCUMENTS

| | | | |
|---|---|---|---|
| 7,898,310 | B2 | 3/2011 | Qui et al. |
| 8,072,200 | B1* | 12/2011 | Qiu .................... G01R 19/0092 323/282 |
| 8,085,017 | B2 | 12/2011 | Qiu et al. |
| 8,305,067 | B2 | 11/2012 | Cheung et al. |
| 8,558,523 | B2 | 10/2013 | Qiu et al. |
| 8,604,768 | B2 | 12/2013 | Dowlatabadi |
| 8,621,246 | B2 | 12/2013 | Ravichandran et al. |
| 9,601,984 | B2* | 3/2017 | Hamanaka .......... H02M 3/1588 |
| 9,823,676 | B2* | 11/2017 | Han ........................ G05F 1/462 |
| 2004/0095110 | A1 | 5/2004 | Kernahan et al. |
| 2005/0001670 | A1* | 1/2005 | Kim .......................... G01K 7/01 327/512 |
| 2005/0071116 | A1* | 3/2005 | Kim ...................... G11C 11/406 702/132 |
| 2009/0296769 | A1* | 12/2009 | Fiennes ................ G01K 15/005 374/1 |
| 2010/0013543 | A1* | 1/2010 | Kang ........................ G01K 7/00 327/512 |
| 2011/0234189 | A1* | 9/2011 | Tanihara ............... H02M 3/156 323/282 |
| 2012/0200271 | A1 | 8/2012 | Henzler |
| 2012/0299560 | A1* | 11/2012 | Gu ...................... H02M 3/1584 323/212 |
| 2012/0313595 | A1 | 12/2012 | Mao et al. |
| 2013/0093251 | A1* | 4/2013 | Kondo ................ H02M 3/1584 307/82 |
| 2014/0028239 | A1* | 1/2014 | Hart ........................ H02P 27/06 318/722 |
| 2014/0197811 | A1 | 7/2014 | Qiu et al. |
| 2015/0002126 | A1* | 1/2015 | Ouyang ............. H02M 3/1584 323/304 |
| 2015/0249391 | A1* | 9/2015 | Yang ................. H02M 3/33576 363/21.01 |
| 2015/0349634 | A1* | 12/2015 | Tschirhart .............. G01R 19/32 323/271 |
| 2016/0087420 | A1* | 3/2016 | Kanakubo .............. H02H 3/087 361/18 |
| 2016/0373047 | A1* | 12/2016 | Loken ............... H02M 7/53875 |

FOREIGN PATENT DOCUMENTS

| | | |
|---|---|---|
| TW | 200506570 A | 2/2005 |
| TW | 201539172 A | 10/2015 |
| TW | I551971 B | 10/2016 |

OTHER PUBLICATIONS

ISL99227, ISL9927B "Smart Power Stage (SPS) Module with Integrated High Accuracy Current and Temperature Monitors", Renesas Datasheet, FIN8684, Rev. 3.00, Oct. 2, 2017, pp. 1-17.
Foreign Action other than Search Report on CN 201810235763.2 dated Mar. 15, 2021.
Foreign Action other than Search Report on CN 201810235763.2 dated Nov. 1, 2021.
Office Action for CN 201810235763.2 dated Nov. 1, 2021.
Office Action for TW 107109611 dated Dec. 2, 2021.

* cited by examiner

COMBINING TEMPERATURE MONITORING AND TRUE DIFFERENT CURRENT SENSING IN A MULTIPHASE VOLTAGE REGULATOR

CROSS-REFERENCE TO RELATED APPLICATIONS

The present application claims priority to U.S. Provisional Patent Application No. 62/475,029 filed Mar. 22, 2017, the contents of which are incorporated herein by reference in their entirety.

TECHNICAL FIELD

The present embodiments relate generally to power controllers, and more particularly to monitoring various operating parameters in a multiphase voltage regulator.

BACKGROUND

Voltage regulators provide a regulated output voltage based on a received input voltage. They are useful in applications such as networking equipment, telecom and datacom equipment, server and storage equipment, Internet of Things (JOT) devices, point-of-load power supply (e.g., power supply for memory, DSP, ASIC, FPGA cores), etc. In these and other applications, the monitoring of various operating parameters of the voltage regulator, such as temperature and current, can be useful for maintaining optimal performance.

SUMMARY

The present embodiments relate generally to power controllers, and more particularly to techniques for providing the ability to monitor one or more operational parameters of a voltage regulator. In embodiments, the voltage regulator is a multiphase voltage regulator having a plurality of power stages corresponding to each respective phase. In these and other embodiments, the operational parameters include one or both of a phase current and a phase temperature. According to certain additional aspects, the present embodiments provide the ability to monitor the respective phase current output and phase temperature of each phase independently. According to further aspects, this ability to monitor the operational parameters is achieved while minimizing circuit complexity.

BRIEF DESCRIPTION OF THE DRAWINGS

Various aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments are directed to techniques for providing the ability to monitor one or more operational parameters of a voltage regulator. In embodiments, the voltage regulator is a multiphase voltage regulator having a plurality of power stages corresponding to each respective phase. In these and other embodiments, the operational parameters include one or both of a phase current and a phase temperature. According to certain additional aspects, the present embodiments provide the ability to monitor the respective phase current output and phase temperature of each phase independently. According to further aspects, this ability to monitor the operational parameters is achieved while reducing circuit complexity as opposed to other approaches.

Figure 1:
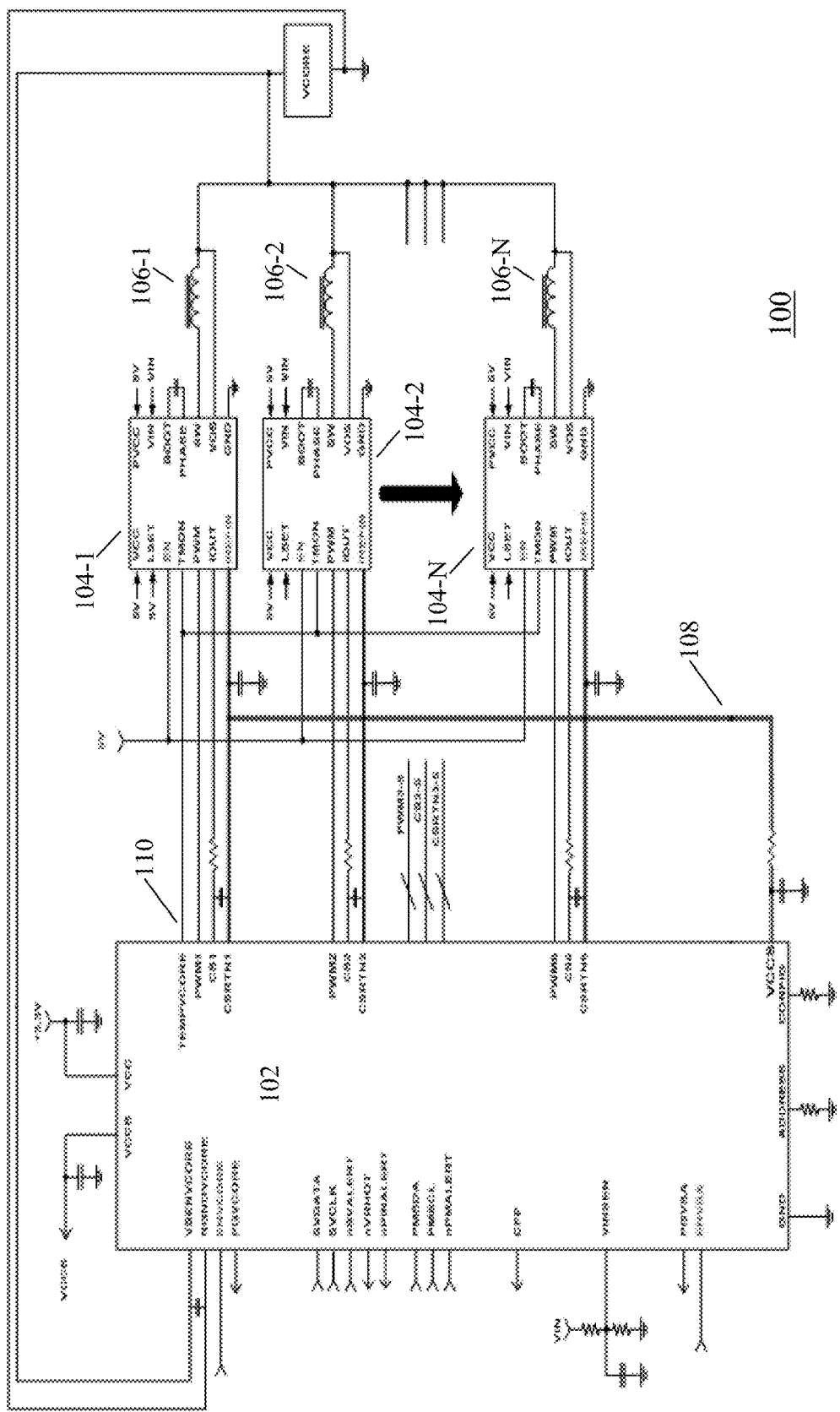
FIG. 1 is a block diagram of a conventional multiphase voltage regulator.

FIG. 1 is a block diagram illustrating one example of a conventional multi-phase voltage regulator. In this example, regulator 100 includes a controller 102 and a plurality (N) of power stages 104, with one power stage 104 for each respective one of the N phases.

Controller 102 is, for example, a flexible multiphase (where N can be any desired number of phases up to a preconfigured maximum of six, for example) PWM controller. In embodiments, controller 102 can meet any applicable Intel server-class transient performance specifications, any microprocessor, FPGA, or Digital ASIC rail requirements and can include an adjustable load setting. Controller 102 can include automatic phase add/drop features to allow maximum efficiency across all load ranges, and the thresholds for automatic phase add/drop can be user-programmable. Controller 102 can include a comprehensive fault management system to further configure individual phases based on fault conditions based on different monitoring signals provided by power stages 104, as will become more apparent from the descriptions below. In these and other embodiments, applications of voltage regulator 100 can include networking equipment, telecom and datacom equipment, server and storage equipment, Internet of Things (JOT) devices, point-of-load power supply (e.g., power supply for memory, DSP, ASIC, FPGA cores), etc.

Controller 102 can employ a constant frequency, dual-edge PWM modulation scheme with both PWM leading and trailing edges being independently moved to give the best response to transient loads. Current balance among phases is an inherent part of the regulation scheme. The modulation scheme is capable of overlapping pulses if the load profile demands such operation. In addition, the modulator is capable of adding or removing pulses from a given cycle in response to regulation demands while still managing maximum average frequency to safe levels. For DC load conditions, the operating frequency is constant. If automatic phase dropping is enabled, the number of active phases at any time can be determined solely by load current. Depending on the number of active phases, controller 102 can employ phase interleaving between PWM signals provided to the respective active phases.

Power stages 104 are switching power controller components. They receive individual PWM signals from controller 102 and drive current into respective inductors 106 based thereon, as can be done in any number of ways known to those skilled in the art. In addition to driving current into inductors 106, power stages 104 can provide a number of different output signals back to controller 102 so that controller 102 can monitor the performance of each individual phase associated with power stages 104. As shown in this example, these output signals can include a phase current signal IOUT and a phase temperature signal TMON. By monitoring these signals provided by each of power stages 104, controller 102 can control the operation of each of the individual phases for optimal performance of regulator 100.

The present applicant recognizes several shortcomings of conventional voltage regulators such as regulator 100 of FIG. 1. For example, in some configurations, each power stage 104 generates its respective phase current signal IOUT with reference to a common reference voltage, which is IREFIN in this example. As such, a separate reference voltage VCCS (e.g. 1.2V) needs to be generated and provided to the power stages 104 to bias IREFIN. Moreover, the IREFIN inputs of all power stages 104 are all tied together and thus are subjected to cross noise coupling, which is not an ideal true different current sensing scheme.

Another example shortcoming of regulator 100 recognized by the present applicant is that the TMON outputs of all individual power stages 104 are tied together, and so only a maximum temperature among all power stages 104 is provided to controller 102. So even though each power stage 104 provides its own temperature, this information for each individual power stage 104 is lost as a result of the TMON outputs for all phases being tied together.

A further shortcoming recognized by the present applicant is that routing of signals between components of regulator 100 is complicated when these components are laid out on a PCB, for example. In general, layout complexity is increased in correspondence with the number of pins required to send and receive signals and the number of destinations for a given signal. As shown, in regulator 100, there are three different pins on each of power stages 104 for the signals TMON, IREFIN and IOUT. Meanwhile, the requirement to provide IREFIN to all phases requires that there be signal traces on a circuit (e.g. a PCB) for providing IREFIN to all of power stages 104.

Figure 2:
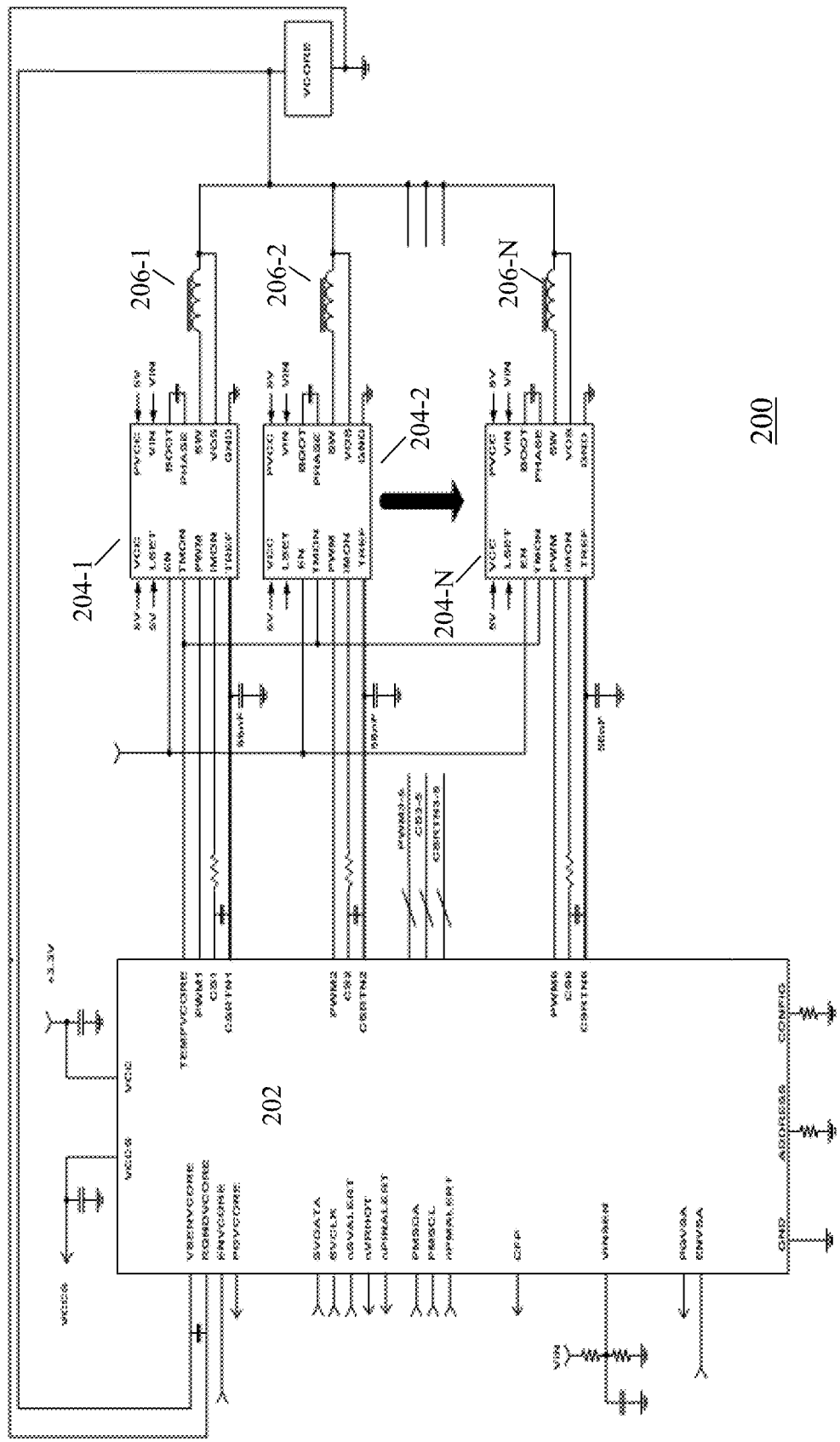
FIG. 2 is a block diagram of an example multiphase voltage regulator according to the present embodiments.

FIG. 2 is a block diagram of an example multi-phase voltage regulator according to embodiments. Similar to regulator 100, example regulator 200 includes a controller 202 and a plurality (N) of power stages 204, with one power stage 204 for each respective one of the N phases. According to certain aspects, however, example regulator 200 differs from the conventional regulator 100, in some important respects. Notably, in this example, each individual phase temperature is provided from each respective power stage 204 by TREF and each individual phase current is provided from each respective power stage 204 by IOUT.

These differences between regulator 200 versus regulator 100 provide various advantages over conventional approaches. First, because TREF can provide controller 202 with the temperature of each power stage 204, thermal management can be performed so as to maintain active thermal balance among phases and also to allow controller 202 to shut down a phase with an abnormal temperature. Moreover, as will be described in more detail below, IOUT now refers to TREF and so it no longer needs a separated voltage reference such as IREFIN, which reduces layout complexity. This configuration further minimizes cross noise coupling between phases and allows controller 202 to obtain true different current sensing for each phase.

It should be noted that, although the present embodiments are described herein with reference to particularly useful applications in a multiphase voltage regulator, that this is not necessary. For example, the principles of the present embodiments can be extended to more general applications, including voltage regulators having only a single phase.

Figure 3:
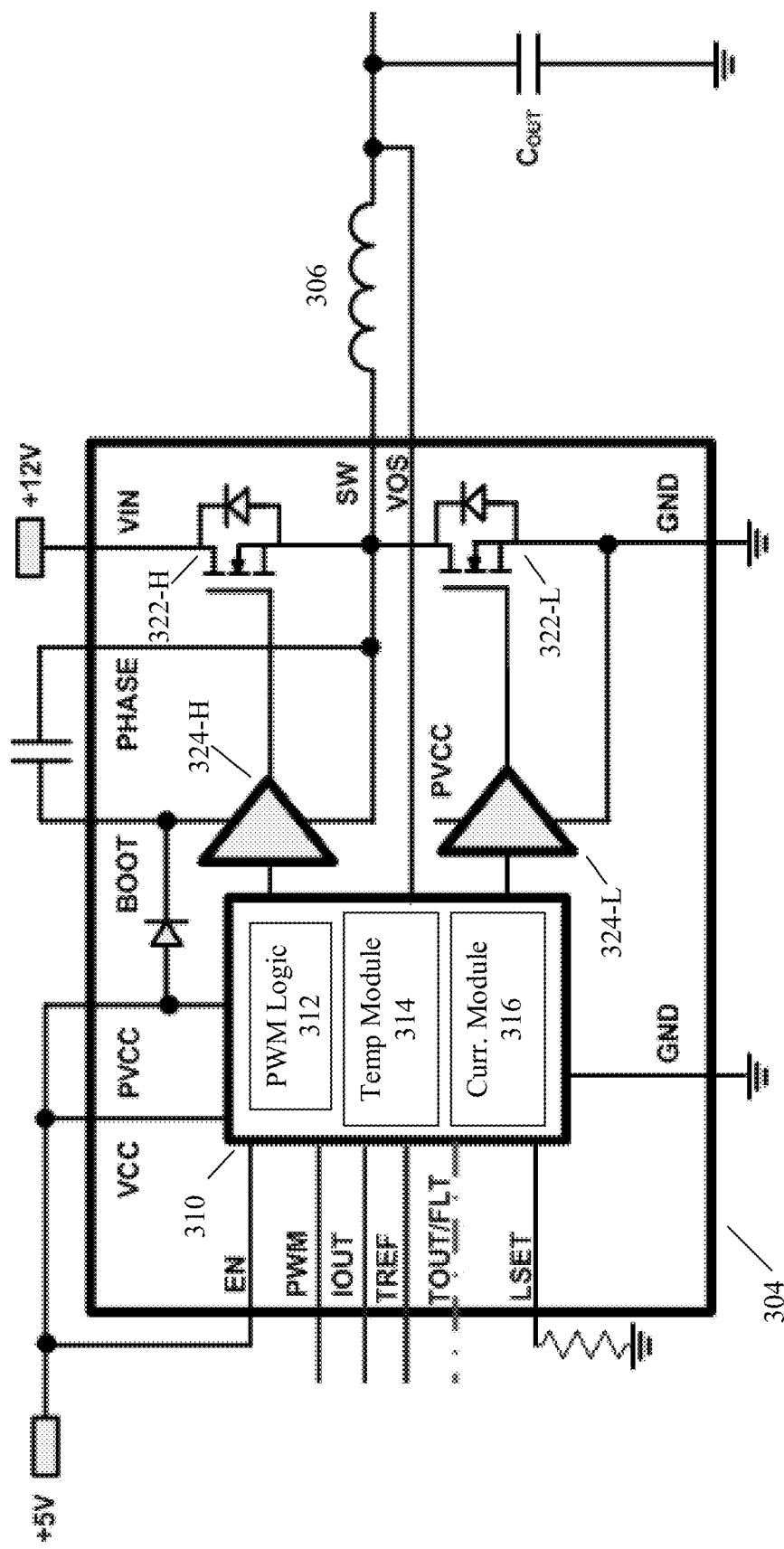
FIG. 3 is a block diagram of an example power stage that can be incorporated into a multiphase voltage regulator according to the present embodiments.

FIG. 3 shows an example power stage that can be used in a multi-phase voltage regulator such as that shown in FIG. 2.

As can be seen, power stage 304 in this example includes a smart module 310 that further includes PWM logic 312, temperature module 314 and current module 316 to be described in more detail below. Power stage 304 also includes high-side transistor 322-H, low-side transistor 322-L, and associated drivers 324-H and 324-L, respectively. Transistors 322-H and 322-L are each shown as N-channel metal-oxide semiconductor, field-effect transistors (MOSFETs) as known to those skilled in the art. Other types of electronic switching devices may be used, such as other types of FETs and the like, and other types of transistors, such as bipolar junction transistors (BJTs) or insulated-gate bipolar transistors (IGBTs) and the like, etc. Drivers 324-H and 324-L are shown in simplified form, but may include bootstrapping or charge pump circuitry to facilitate driving the gates of transistors 324-H and 324-L above certain thresholds.

PWM logic 312 receives PWM signals from controller, 102 and drives current into inductor 306 based thereon, as can be done in any number of ways known to those skilled in the art. More particularly, for example, PWM logic 312 receives PWM signals from the controller and generates separate signals for turning on/off transistors 322-H and 322-L via drivers 324-H and 324-L, thereby alternately coupling inductor 316 to VIN and ground, respectively, at a switching frequency and duty cycle established by the PWM signals from the controller. PWM logic 312 can further include functionality for performing a variety of other tasks familiar to those skilled in the art such as dead time and shoot-through protection, high-side FET short and overcurrent protection, etc., perhaps in connection with various reporting signals such as the signal VOS representing the voltage at the output of inductor 306.

Temperature module 314 in this example generates a temperature compensated voltage TREF in correspondence with the temperature of the phase associated with the power stage 304. In one example, temperature module 314 incorporates or is implemented by a low dropout (LDO) regulator that operates using a supply voltage VCC (e.g. 5V). More particularly, in this example, temperature module 314 has a thermal sensor coupled to the junction between transistors 322-H and 322-L. Based on this temperature (Tj), temperature module 314 generates a LDO output voltage, or voltage derived from the LDO output, the generated voltage having a known base voltage value and a known variable proportional to the temperature in the power stage 304. For example, the output of module 314 can be TREF=1.0V+4 mV*Tj, where Tj can range from −40 degrees C. to +50 degrees C., 1.0V is the known base voltage at 0 degrees C. (or other base temperature) and 4 mV is the known variable temperature coefficient per degrees C. However, the present embodiments are not limited to this particular LDO-based scheme for reporting a phase temperature, and those skilled in the art will recognize that many alternative phase temperature reporting schemes are possible. Since TREF is used as a reference for current sensing module 316 as will be described in more detail below, temperature module 314 preferably allows it to both sink and source current.

Current sensing module 316 monitors the current output onto inductor 306 by power stage 304 and produces an output IOUT voltage that is proportional to the sensed current. For example, current sensing module 316 can monitor the current of low-side transistor 322-L and high-side transistor 322-H and use that information to produce the IOUT signal which is intended to approximate the actual waveform of the inductor 306 current $I_L$. In this and other examples, and with reference to the example power stage 304 in FIG. 3, current sensing module 316 generates the IOUT signal by monitoring the PHASE, VOS and PGND (source connection of low-side transistor 322-L) voltages to produce a voltage having the value of IOUT=TREF+$I_L$*5 mV/A. Thus, IOUT refers to TREF and no longer requires the separated reference IREFIN. Moreover, because the controller receives both TREF and IOUT, the controller can easily monitor both the phase temperature (using TREF) and phase current (using IOUT and TREF) of each phase independently of each other, using only these two pins and signals.

As further shown in the example of FIG. 3, power stage 304 can include an optional pin TOUT for separate temperature reporting. In this example, temperature module 314 can output the TREF signal on both the TREF pin and the TOUT pin. This can provide pin compatibility where a controller requires a dedicated input for temperature reporting that is separate from the signals that are used to obtain current information. It should be noted, however, that the values of TREF and TOUT can be different. For example, TOUT can be generated as TOUT=0.6V+8 mV*Tj, where Tj can range from −40 degrees C. to +50 degrees C., 0.6V is the known base voltage at 0 degrees C. (or other base temperature) and 8 mV is the known variable temperature coefficient per degrees C.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. An apparatus for monitoring one or more operational parameters of a voltage regulator, comprising:
    a temperature monitor that produces a temperature signal having a value proportional to a temperature in the voltage regulator;
    a current monitor that produces a current signal having a value proportional to a current output by the voltage regulator;
    a temperature module that generates a first signal using the temperature signal, wherein the first signal comprises a common reference signal; and
    a current module that generates a second signal by combining together the first signal and the current signal, the current signal being produced by and output by the current monitor, wherein both the first signal and the second signal refer to the common reference signal such that the temperature in the voltage regulator and the current output by the voltage regulator can both be derived using the first signal comprising the common reference signal.

2. The apparatus of claim 1, wherein the voltage regulator is comprised of an integrated circuit package having a plurality of external input/output pins including first and second output pins for outputting the first and second signals, respectively.

3. The apparatus of claim 1, wherein the temperature corresponds to a junction temperature between high and low side power transistors in the voltage regulator.

4. The apparatus of claim 1, wherein the current corresponds to an inductor current in the voltage regulator.

5. The apparatus of claim 1, wherein the voltage regulator is a multiphase voltage regulator having a plurality of power stages corresponding to each respective phase, and wherein the first and second signals are generated by each of the plurality of power stages.

6. The apparatus of claim 5, further comprising first and second output pins in each of the plurality of power stages for outputting the first and second signals, respectively.

7. A method for monitoring one or more operational parameters of a voltage regulator, comprising:
    producing a temperature signal having a value proportional to a temperature in the voltage regulator;
    producing, by a current monitor, a current signal having a value proportional to a current output by the voltage regulator;
    generating a first signal using the temperature signal, wherein the first signal comprises a common reference signal; and
    generating a second signal by combining together the first signal and the current signal, the current signal being produced by and output by the current monitor, wherein both the first signal and the second signal refer to the common reference signal such that the temperature in the voltage regulator and the current output by the voltage regulator can both be derived using the first signal comprising the common reference signal.

8. The method of claim 7, wherein the voltage regulator is comprised of an integrated circuit package having a plurality of external input/output pins, the method further comprising outputting the first and second signals on first and second output pins of the plurality of input/output pins, respectively.

9. The method of claim 7, wherein the temperature corresponds to a junction temperature between high and low side power transistors in the voltage regulator.

10. The method of claim 7, wherein the current corresponds to an inductor current in the voltage regulator.

11. The method of claim 7, wherein the voltage regulator is a multiphase voltage regulator having a plurality of power stages corresponding to each respective phase, and wherein the first and second signals are generated by each of the plurality of power stages.

12. A multiphase voltage regulator, comprising:

a controller; and a plurality of power stages corresponding to each respective phase, each of the plurality of power stages including:

a temperature monitor that produces a temperature signal having a value proportional to a temperature in the power stage;

a current monitor that produces a current signal having a value proportional to a current output by the power stage;

a temperature module that generates a first signal using the temperature signal wherein the first signal comprises a common reference signal; and a current module that generates a second signal by combining together the first signal and the current signal, the current signal being produced by and output by the current monitor, wherein both the first signal and the second signal refer to the common reference signal such that the temperature in the voltage regulator and the current output by the voltage regulator can both be derived using the first signal comprising the common reference signal.

13. The multi-phase voltage regulator of claim 12, wherein each of the plurality of power stages is comprised of an integrated circuit package having a plurality of external input/output pins including first and second output pins for outputting the first and second signals, respectively, and wherein the controller includes a plurality of pins respectively coupled to the first and second output pins of all of the power stages.

14. The multi-phase voltage regulator of claim 12, wherein the temperature corresponds to a junction temperature between high and low side power transistors in the power stage.

15. The multi-phase voltage regulator of claim 12, wherein the current corresponds to an inductor current in the power stage.

16. The apparatus of claim 1, wherein the current output by the voltage regulator is derived by subtracting a value of the first signal from a value of the second signal.

17. The method of claim 7, wherein the current output by the voltage regulator is derived by subtracting a value of the first signal from a value of the second signal.

18. The multi-phase voltage regulator of claim 12, wherein the current output by the voltage regulator is derived by subtracting a value of the first signal from a value of the second signal.

19. The apparatus of claim 1, wherein the voltage regulator is controlled by a controller, wherein the current module outputs the second signal to the controller, and wherein the controller controls the voltage regulator based on the second signal.

\* \* \* \* \*